Figure 1:
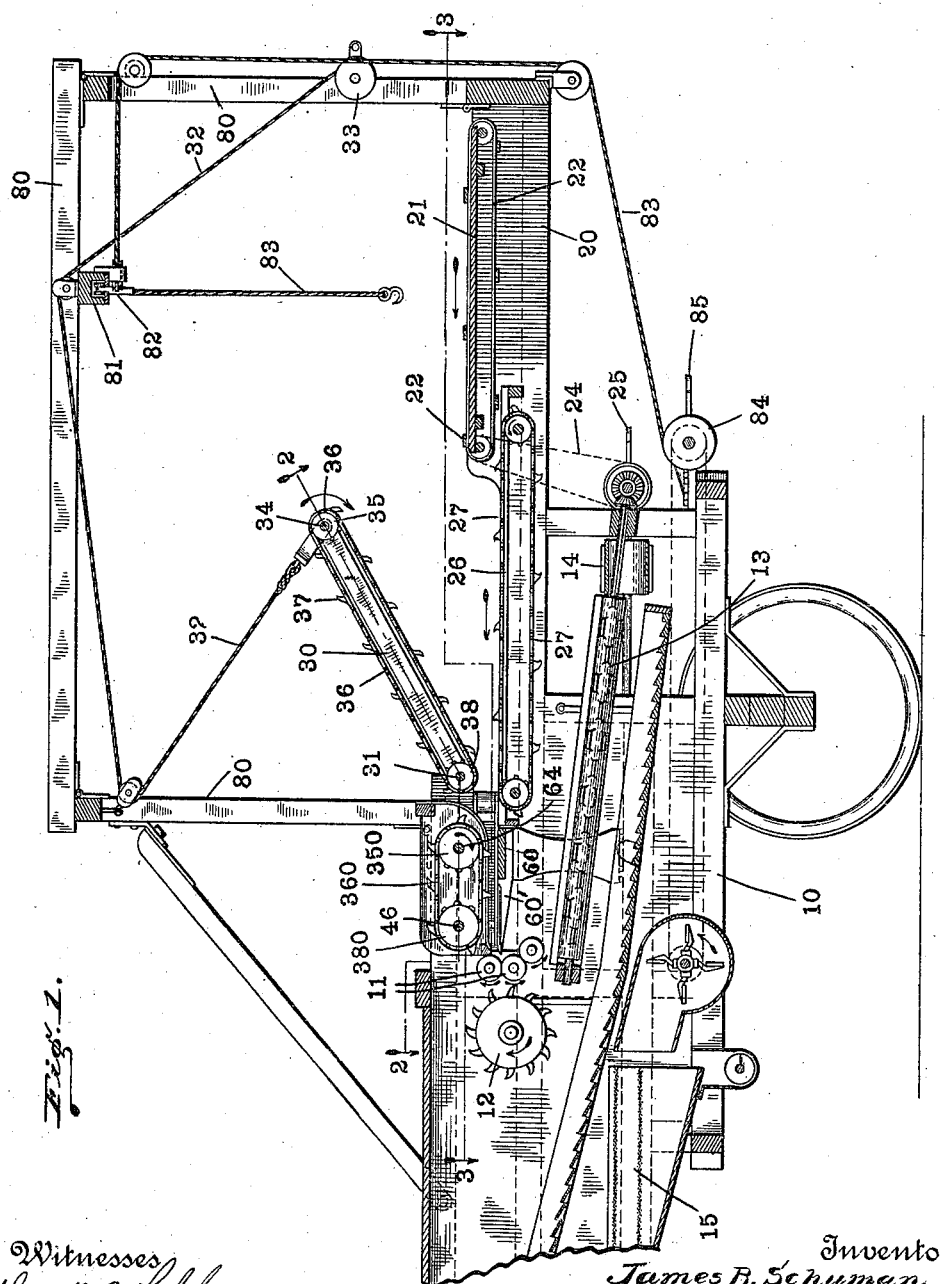

J. B. SCHUMAN.
SHREDDER FEEDER.
APPLICATION FILED NOV. 8, 1905.

987,830.

Patented Mar. 28, 1911.

3 SHEETS—SHEET 1.

Witnesses
Frank A. Fahle
J. A. Walsh

Inventor
James B. Schuman
By
Bradford & Hood
Attorneys

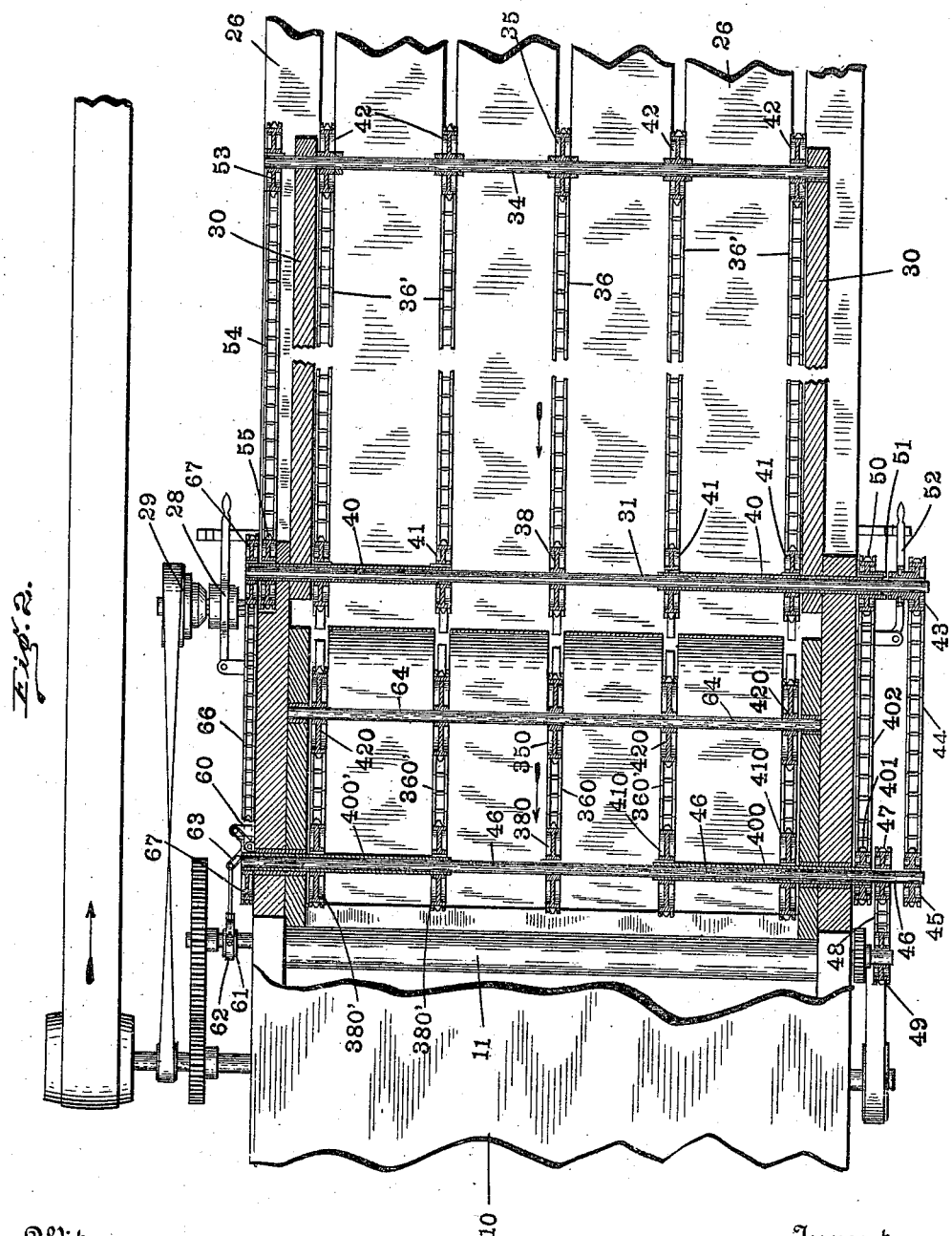

J. B. SCHUMAN.
SHREDDER FEEDER.
APPLICATION FILED NOV. 8, 1905.
987,830.
Patented Mar. 28, 1911.
3 SHEETS—SHEET 3.
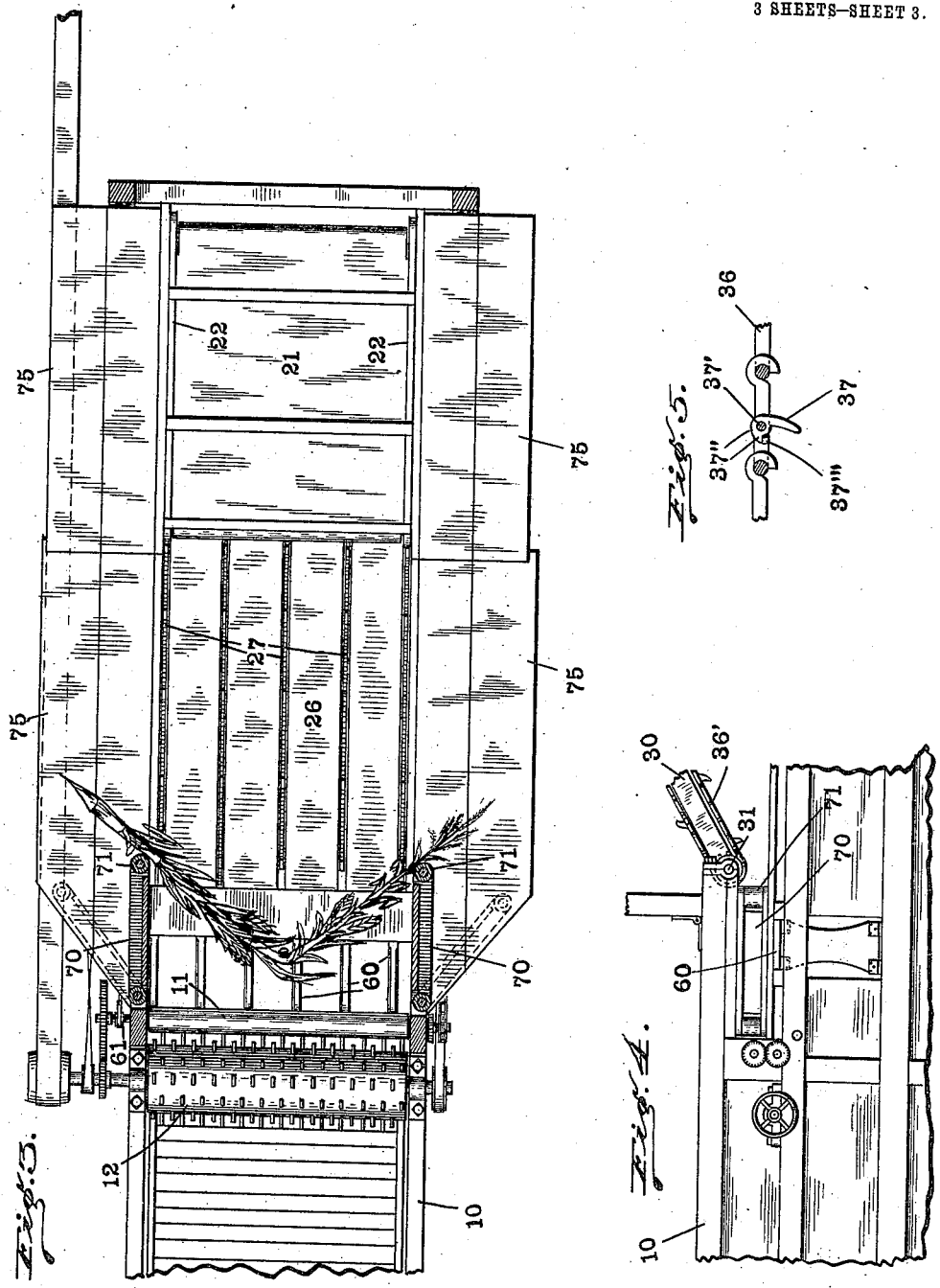

UNITED STATES PATENT OFFICE.

JAMES B. SCHUMAN, OF INDIANAPOLIS, INDIANA, ASSIGNOR TO THE SCHUMAN COMPANY, OF INDIANAPOLIS, INDIANA, A CORPORATION OF MAINE.

SHREDDER-FEEDER.

987,830.

Specification of Letters Patent.   Patented Mar. 28, 1911.

Application filed November 8, 1905. Serial No. 286,439.

*To all whom it may concern:*

Be it known that I, JAMES B. SCHUMAN, a citizen of the United States, residing at Indianapolis, in the county of Marion and State of Indiana, have invented certain new and useful Improvements in Shredder-Feeders, of which the following is a specification.

The object of my invention is to provide a mechanism by which entire shocks of corn, or other stalk crops, may be delivered to the feeder and by it automatically delivered in successive portions to a shredder or other stalk treating means.

A further object of my invention is to provide a structure by means of which the stalks may be fed crosswise to the snapping rollers or other treating means instead of endwise as has heretofore been customary.

The accompanying drawings illustrate my invention.

Figure 1 is a central vertical section of a machine embodying my invention; Fig. 2 a section on line 2 2 of Fig. 1 on an enlarged scale; Fig. 3 a section on line 3 3 of Fig. 1, Fig. 4 is a side elevation of the feeding throat, and Fig. 5 a detail of one of the feed belts.

In the drawings, 10 indicates a shredder provided with a pair of transverse snapping rollers 11, a shredder cylinder 12 to the rear thereof, husking rollers 13 arranged beneath the snapping rollers, the transverse corn discharging belt 14, and the screens 15 of any well known form.

My feeder attachment consists of a frame 20 which is adapted to be either attached to a shredder, or built integrally therewith, preferably the latter. At the front end this frame is provided with a horizontal table 21 which is of sufficient size to receive an entire shock of corn laid upon its side. Running over this platform 21 is an endless raddle belt 22 adapted to be driven occasionally in the direction indicated by the arrow in Fig. 1. This belt 21 is driven by means of a belt 24 from any continuously moving portion of the machine, an intermediate connection being made therewith by any suitable clutch through the medium of the clutch lever 25, or otherwise, the construction being such that the raddle 22 may be driven in the direction indicated whenever desired, so as to discharge an entire shock upon a slotted platform 26 in which run suitable feed belts 27, said belts being also intermittently moved in the direction indicated by the arrow in Fig. 1 by means of suitable clutch mechanism 28 and a pulley 29 which is constantly driven.

Arranged above the platform 26 is a feeder frame 30 which is pivoted at its rear end on the shaft 31, a comparatively short distance above the platform 26. The forward free end of frame 30 is held by means of a rope 32 which is passed up and forward to a suitable windlass 33 by means of which the height of the forward end of the frame 30 may be readily adjusted, so that the feeder belts carried thereby may be dropped down into engagement with the upper portion of a shock of corn discharged upon the platform 26.

It is very difficult to present the butt ends of corn stalks to the snapping rolls as the butts are large and hard and the rolls do not readily take hold. I deem it desirable, therefore, that an intermediate softer portion of the stalk be first presented to the rolls, the action of the rolls, so far as the ears are concerned, being the same in either case. For this it is desirable that the middle one of the feeder belts carried by the frame 30 be moved more rapidly than the end belts, and I have therefore provided a structure illustrated more especially in Fig. 2. The frame 30 carries at its free end a shaft 34 upon which is journaled at its middle, a sprocket wheel 35 over which runs a feed chain 36 having suitable drag teeth 37. Chain 36 passes over a sprocket wheel 38 which is attached to the shaft 31. Sleeved upon each end of shaft 31 is a sleeve or tubular shaft 40 which carries one or more sprocket wheels 41. Running over each of the sprocket wheels 41 is a chain 36' which is similar to the chain 36, and provided with similar feed teeth. The chains 36' also run over sprocket wheels 42 which are journaled upon the shaft 34. In order that there may be a difference in speed of the movement of the chains 36 and 36' I arrange to drive shaft 31 continuously by means of a sprocket wheel 43 which is splined upon said shaft and is driven by a chain 44 which passes around a sprocket wheel 45 carried by a shaft 46. This shaft is in turn driven by the sprocket 47, chain 48 and sprocket 49 carried by one of the snapping shafts.

Whenever a difference in movement of chain 36 and chains 36' is desired, the chains 36' are allowed to stand still, and in order to accomplish this result one of the sleeves 40 (at the bottom of Fig. 2) is provided with a sprocket wheel 50, and the hubs of the two wheels 43 and 50 are provided with interengaging clutch members 51, the arrangement being such that the sprocket wheel 43 may be shifted on the shaft 41 by means of a suitable shifting lever 52. If desired, the various sprocket wheels 42 might be attached to the shaft 34 in which case the chains 36' at the upper end of Fig. 2 would be driven from the wrong end, and in order to provide proper driving at the ends of these two chains I prefer to key only one of the sprocket wheels 42 of the shaft 34 (the one in the lower right hand corner of Fig. 2), and then attach to the other end of shaft 34 a sprocket wheel 53 which carries the chain 54, which chain extends to a sprocket wheel 55 attached to the sleeve 40 at that side of the machine.

The chains 27 and 36' form a throat which delivers the stalks in a comparatively thin layer (practically one at a time) to a transversely reciprocating finger bar 60 which lies immediately to the rear of the platform 26 and has longitudinal fingers 60' which bridge the space between said platform and the crotch of the snapping rollers 11. The finger bar 60 may be reciprocated by any suitable means, such for instance, as the eccentric 61, strap 62 and bell-crank lever 63 which is connected to the finger bar 60. Arranged immediately above the finger bar 60, and immediately to the rear of the chains 36 and 36' are similar chains 360 and 360'. The chain 360 is in alinement with the chain 36, and is carried by a sprocket wheel 380 attached to the middle of shaft 46, and a sprocket wheel 350 journaled on a shaft 64. Sleeved upon one end of shaft 46 is a sleeve 400 which, like sleeve 40, carries a pair of sprocket wheels 410 over each of which runs one of the chains 360', said chains also running over sprocket wheels 420 which are journaled on the shaft 64. The sleeve 400 is provided with a sprocket wheel 401, and a chain 402 runs to said sprocket wheel from the sprocket wheel 50. At the other end of shaft 46 I provide a sleeve 400' which carries sprocket wheels 380' over which run other chains 360' which are in alinement with the similar chains 36'. The sleeve 400' is driven by means of a chain 66, a sprocket wheel 67 attached to the adjacent sleeve 40, and a sprocket wheel 67' attached to the sleeve 400'. The arrangement of the several chains 36, 360 and 36' and 360' is such that by shifting lever 52 to the position shown in Fig. 2, the two chains 36 and 360 will be driven while the chains 36' and 360' will remain stationary or, by shifting the sprocket wheel 43 so as to bring the clutch members into coaction all of the chains will be driven at the same speed, or a different speed if a difference in diameter be made between the sprocket wheels 45 and 43. In order to permit the chains 36' and 360' to remain idle without interfering with the feeding of the stalks by the chains 36 and 360, I deem it advisable to pivot the drag fingers 37 of each chain on a pivot 37', and provide each of said fingers with a stop member 37'' adapted to engage a stop 37''' on the chain, said stops limiting the pivotal movement of the finger 37 in one direction.

The structure described is intended to handle the stalks crosswise, and, in order that the shredder may not need to be of excessive width, I provide at each end of the snapping rollers an adjustable throat which is formed by a pivoted throat-piece 70 pivoted at the end nearest the snapping rollers and capable of being swung outwardly to widen the throat, as indicated by dotted lines in Fig. 3. Each of these throat pieces is provided at its forward end with a roller 71 to facilitate the dragging of the ends of the stalk thereover, as indicated in Fig. 3.

The platforms 21 and 26 are suitably flanked by working platforms 75 which may be turned down for transportation.

In order to lift entire shocks to the platform 21, I provide a suitable derrick frame 80 which carries a transverse track beam 81 upon which is movably mounted a hoisting carriage 82 having a hoisting rope 83, said rope passing downward over suitable idlers to a winding drum 84 which may be connected by the use of a suitable shifting lever 85 with any moving part of the machine so as to lift the shocks by power. As the power lifting mechanism forms no part of my present invention I do not deem it necessary to illustrate it in any further detail.

In operation, an entire shock of corn is lifted onto the platform 21, and after its band has been cut, the raddle 22 is moved in the direction indicated by the arrow so as to discharge the entire shock, or any portion thereof, onto the platform 26 into the crotch formed between said platform and the feeder frame 30, the chains 27 being driven forward enough to bring the stalks sufficiently into the crotch. The feeder frame 30 is then lowered until its chains will engage the stalks in the upper portion of the mass on the platform 26, and these chains serve to strip these stalks from the upper portion of the mass, and carry them downward and rearward, forcing them between the throat pieces 70, as indicated in Fig. 3, and delivering them to the chains 36 and 360 which in turn deliver the stalks to the snapping rollers 11 between which the stalks pass to the shredder drum 12, while the ears of corn which are snapped by the snapping rollers drop to the husking rollers 13. If the stalks are too long to be readily fed to the snapping rollers by the combined action of all of the feed chains, the outer chains 36' and 360' will be stopped, and the stalks grasped only at their middles, and driven rearward between the throat pieces so as to be doubled upon themselves. As the mass of stalks on the platform 26 decreases, the feeder frame 30 will be lowered, the chains of said frame serving continuously to feed the stalks from the top of the mass and not from the bottom. In the course of time a new mass of stalks is delivered to the platform 26 by the raddle 22 and the operation is repeated.

I claim as my invention:

1. The combination, with stalk crop treating means, of means for supporting a mass of stalks in feeding position relative thereto, means adjacent the supporting means for engaging stalks of the mass successively and carrying them to the treating means, and means adjacent the line of movement of the stalks for bending the stalks at an intermediate point and presenting the advanced intermediate point to the treating means.

2. The combination, with stalk crop treating means, of means for holding a mass of stalks in feeding position relative thereto, members forming a feeding throat leading from said supporting means to the treating means, the outer end of said throat members engaging the ends of the stalk, and means for engaging an intermediate portion of the stalk to drive the same into the throat with an intermediate portion of the stalk in advance of its ends.

3. The combination, with stalk crop treating means, of a feeding platform adapted to receive a mass of stalks, a feeding frame arranged above said supporting platform and movable toward and from the same, and feeding means carried by said feeding frame to engage the upper stalks of the mass and drive them successively toward the treating means with their middles in advance of their ends.

4. The combination, with stalk crop treating means, of a feeding platform adapted to receive a mass of stalks, a feeding frame arranged above said supporting platform and movable toward and from the same, feeding means carried by said feeding frame to engage the upper stalks of the mass to bend the same with their middles in advance of their ends and drive them successively toward the treating means, and means for occasionally advancing a mass of stalks along the receiving platform toward the treating means.

5. A feeder consisting of a platform adapted to receive a mass of stalks transversely thereon, a feeder frame arranged above said platform and adjustable toward and from the same, and a feeding means carried by said frame to engage the upper stalks of the mass and drive the same forward transversely with their middles in advance of their ends.

6. A feeder consisting of a platform adapted to receive transversely a mass of stalks, a second platform arranged forward of said first platform and also adapted to receive a mass of stalks transversely from the first platform, feeding means adapted to engage an intermediate portion of the stalks and drive the same forward transversely, and means for engaging the ends of the stalks and retarding the same whereby the stalks will be bent at an intermediate point and driven forward with the apex in advance.

7. In a stalk feeder, the combination with members forming a feeding throat having outer ends adapted to engage the ends of stalks, of means arranged before said throat for engaging an intermediate portion of a stalk and driving the same transversely into the feeding throat, whereby the stalk will be bent and fed forward apex first.

8. The combination, with a pair of co-acting snapping rolls, of feeding means arranged in the throat of said snapping rolls, said feeding means comprising mechanism to engage and bend a corn stalk forwardly at a point intermediate of its length, and drive said forwardly bent portion to said snapping rolls.

9. The combination with a pair of co-acting snapping rolls of feeding means arranged in the throat of said rolls, said feeding means comprising a movable feeder member movable toward the throat of said rolls at a point intermediate of the length of the rolls and formed to positively engage corn stalks at a point intermediate of their lengths to drive the same forwardly positively into the throat of the rolls, and means for retarding the forward movement of the ends of the stalks relative to the forward movement of the middle thereof whereby the stalks are initially given a V-shape with the point in advance of the ends and said point driven into the throat between the rolls in advance of the ends.

In witness whereof, I have hereunto set my hand and seal at Indianapolis, Indiana, this first day of November, A. D. one thousand nine hundred and five.

JAMES B. SCHUMAN. [L. S.]

Witnesses:
ARTHUR M. HOOD,
JAMES A. WALSH.

Copies of this patent may be obtained for five cents each, by addressing the "Commissioner of Patents Washington, D. C."